United States Patent [19]

Chisholm

[11] Patent Number: 4,990,921
[45] Date of Patent: Feb. 5, 1991

[54] MULTI-MODE MICROWAVE LANDING SYSTEM

[75] Inventor: John P. Chisholm, Olympic Valley, Calif.

[73] Assignee: Sundstrand Data Control, Inc., Redmond, Wash.

[21] Appl. No.: 45,911

[22] Filed: May 1, 1987

[51] Int. Cl.⁵ .......... G01S 1/14; G01S 13/80; G01S 13/93

[52] U.S. Cl. .......... 342/35; 342/37; 342/38; 342/407; 342/410; 342/411; 342/412; 342/33

[58] Field of Search .......... 342/35, 386, 407, 409, 342/410, 411, 412, 33, 34, 36, 37, 38

[56] References Cited

U.S. PATENT DOCUMENTS

| | | | |
|---|---|---|---|
| 2,415,566 | 2/1947 | Rhea | 342/155 |
| 2,537,995 | 3/1952 | Griggs | 71/88 |
| 2,572,725 | 10/1951 | Hirsch | 342/33 |
| 3,101,471 | 8/1963 | Stavis | 342/147 |
| 3,164,827 | 1/1965 | Preikschat | 342/34 |
| 3,181,153 | 4/1965 | Cella | 342/33 |
| 3,350,714 | 10/1967 | Walker et al. | 342/398 |
| 3,401,389 | 9/1968 | Toman | 342/408 |
| 3,564,543 | 2/1971 | Nehama et al. | 342/33 |
| 3,697,997 | 10/1972 | Cooper | 342/413 |
| 3,775,766 | 11/1973 | Gendreu et al. | 342/33 |
| 3,781,891 | 12/1973 | Moose | 342/411 |
| 3,810,181 | 5/1974 | Tierney et al. | 342/411 |
| 3,893,119 | 7/1975 | Montel | 342/410 |
| 3,952,309 | 4/1976 | Lammers | 342/411 |
| 3,964,067 | 6/1976 | Lucas | 342/412 |
| 3,967,278 | 6/1976 | Buehler et al. | 342/411 |
| 3,968,495 | 7/1976 | Hergenrother | 342/410 |
| 4,115,777 | 9/1978 | Taylor | 342/411 |
| 4,128,835 | 12/1978 | Russell | 342/46 |
| 4,170,773 | 10/1979 | Fitzsommons et al. | 342/42 |
| 4,418,349 | 11/1983 | Hofgen et al. | 342/37 |
| 4,429,312 | 1/1984 | Chisholm | 342/410 |
| 4,454,510 | 6/1984 | Crow | 342/32 |
| 4,635,064 | 1/1987 | Chisholm | 342/408 |
| 4,677,442 | 6/1987 | Enein | 342/410 |
| 4,680,587 | 7/1987 | Chisholm | 342/33 |
| 4,723,126 | 2/1988 | Chisholm | 342/408 |

FOREIGN PATENT DOCUMENTS 120687 1/1947 Australia .
126915 9/1950 Australia .

OTHER PUBLICATIONS

Rhodes, Donald R., Ph.D., "Introduction of Monopulse", McGraw-Hill Book Company, Inc., Chapter 1, pp. 1–19, (1959).

Primary Examiner—Thomas H. Tarcza
Assistant Examiner—John B. Sotomayor
Attorney, Agent, or Firm—Michael S. Yatsko

[57] ABSTRACT

A guidance system for landing an aircraft is described which uses a source of signals identifiable with the aircraft and a ground station which is linked to the aircraft. Specifically, the ground station includes a receiver which is connected to one or more pairs of antennas having a fixed, overlapping, directional sensitive pattern symmetically located relative to the center of the landing path, a receiver and a processor for measuring the relative sensitivity of the signals received at the antennas and for using the relative signal intensity to determine the location of the aircraft relative to the center of the landing path.

15 Claims, 8 Drawing Sheets

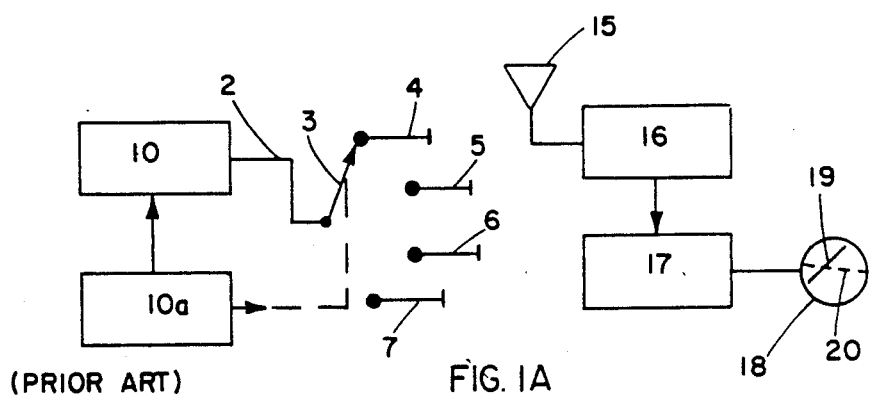
(PRIOR ART) FIG. 1A
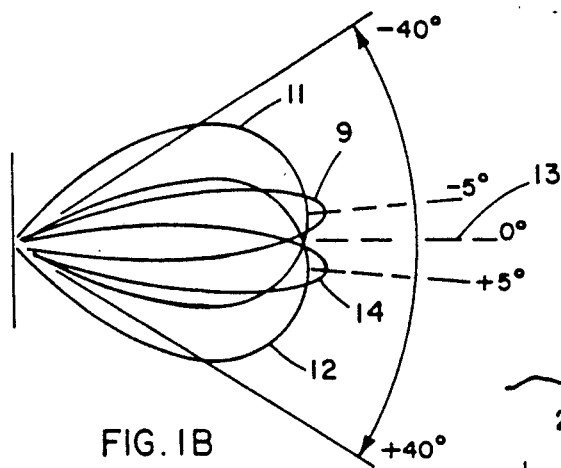
FIG. 1B
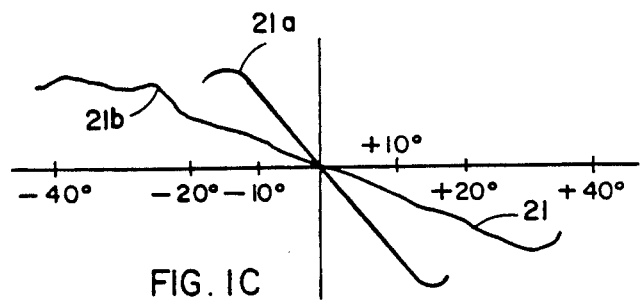
FIG. 1C
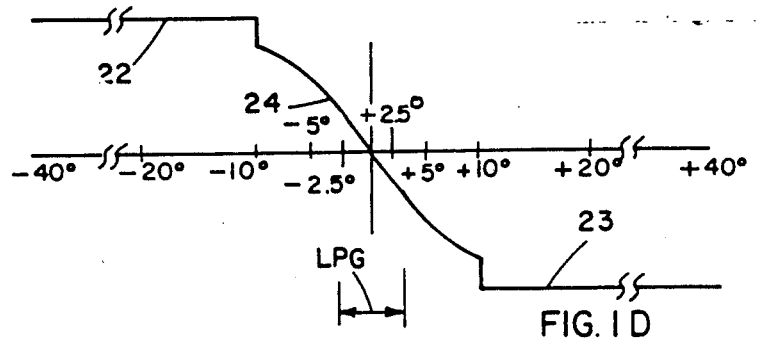
FIG. 1D

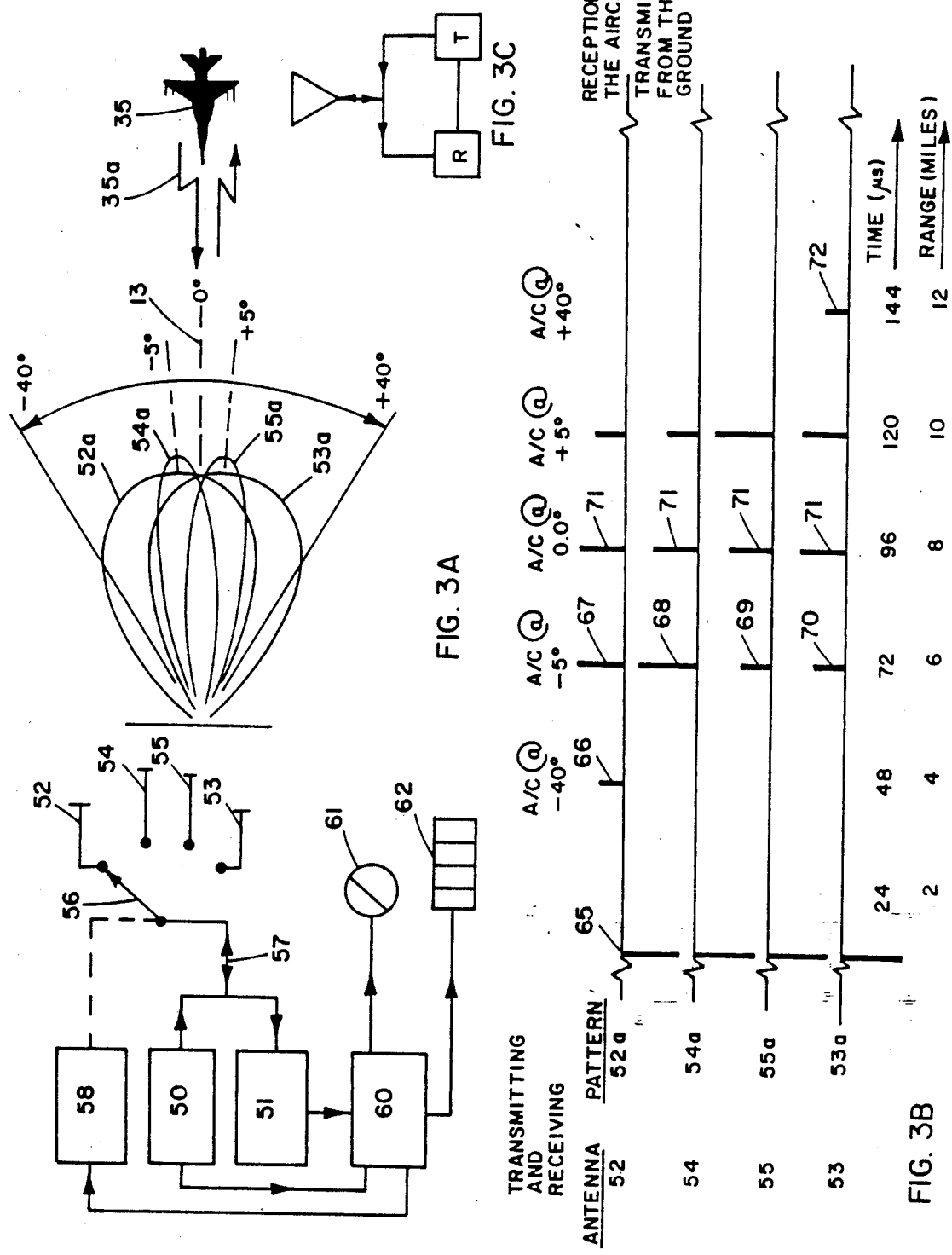

MULTI-MODE MICROWAVE LANDING SYSTEM

TECHNICAL FIELD

This invention is related to the general subject of aircraft guidance and control systems and, in particular, to those systems used for landing and otherwise guiding an aircraft using microwave radiation.

BACKGROUND OF THE INVENTION

There are two well established and different techniques for guiding aircraft to a safe landing in inclement weather. A first technique consists of radiating signals from ground based directional antennas with such signals being received in the aircraft and processed accordingly to provide aircraft guidance to a landing. The airborne processor attached to the receiver operates on the received signals in accordance with knowledge of the nature of the guidance beams radiated. This first technique can be classified as an "air derived" system, since the basic guidance data is derived in the aircraft. ILS, the newer MLS and the system described in my U.S. Pat. No. 4,429,312 are air derived systems.

A second technique uses a ground based radar that locates the aircraft via conventional radar practices, (i.e., radiating a transmission and determining the aircraft location via ground based reception) using directional antenna(s), and the aircraft skin echo resulting from that transmission. This second technique can be classified as a "ground derived" system, since the basic aircraft location is derived on the ground and relayed to the aircraft, via voice, for example. GCA (Ground Controlled Approach), also called PAR (Precision Approach Radar), is an example of such a ground derived system. A basic advantage of GCA, is that it can be used to recover minimally equipped aircraft in that all that is required in the aircraft to obtain guidance data is a voice radio that the pilot can use to receive the ground derived guidance data. GCA is thus highly desirable for military purposes and currently finds its use in such applications.

The nature of the guidance technique employed in air derived systems can be further classified into the use of fixed beams and scanning beams. An example of the use of fixed beams is provided by ILS and by the system described in my U.S. Pat. No. 4,429,312. In ILS, paired overlapping fixed beams define a localizer, or azimuth guidance path, and additional paired, overlapping fixed beams define a glideslope path. When the aircraft receiver and associated guidance processor separately indicate that the localizer and glideslope paired, overlapping fixed guidance beam signals are of equal intensity, the aircraft is on the desired landing approach path. ILS is characterized by providing only one desired, prescribed, or predetermined landing path, generally runway centerline and one fixed glideslope. It is further characterized by relatively simply ground based equipment employing an array of fixed beam antennas.

An example of the use of scanning beams in an air derived system is provided by the relative new FAA approved MLS. In MLS, a narrow precision guidance beam is scanned in azimuth, about the runway centerline. Additionally, a separate beam is scanned in elevation. In the aircraft, a receiver and associated processor detects the passage of such scanning beams and, together with knowledge of the nature of the scanning process, determines the aircraft location with respect to a desired landing path. MLS is characterized by providing pilot selectable approach paths. MLS is also characterized by highly complex ground equipment, required for the generation of the scanning beams.

GCA provides an example of the use of scanning beams in a ground derived system. GCA employs separate azimuth and elevation narrow scanning beams for aircraft location and associated recovery purposes. These beams scan the desired approach region in azimuth, and in elevation, and determine aircraft location with respect to a desired azimuth and elevation approach path by virtue of the range and azimuth (or elevation) at which the aircraft skin echo is detected in such azimuth and elevation scanning processes.

ILS, an air derived fixed beam guidance system, evolved prior to the development of the scanning beam GCA system. The development of scanning beam MLS was initiated in the 60's, long after both GCA and ILS were operational, as an ILS replacement system that would ostensibly overcome the then existing deficiencies of the fixed beam low frequency ILS system. In this MLS development program, scanning beams, as opposed to fixed beam guidance technology, were employed in order to provide the pilot flexibility in selecting a landing guidance path.

Currently, the MLS program faces serious user acceptance to its being implemented as an ILS replacement system. This objection is primarily based on the fact that the fixed beam ILS system, with the improvements that have been made in it since the 60's, provides very acceptable landing guidance.

The military, however, still has a need for a GCA type of system for operating in the battle environment with minimally configured aircraft, both manned and unmanned (drones or RPV's). The complex scanning beam mechanism of current GCA equipment, with its associated initial cost and required maintenance, poses a serious drawback to its continued use however and, hence, the military is tending to transition to air derived systems such as ILS, and the microwave fixed beam landing system described in my U.S. Pat. No. 4,429,312, and MLS, if MLS ground equipment can be made sufficiently light and compact, a task that has yet to be accomplished, despite expenditure of considerable time and effort.

What is required then is a ground derived aircraft recovery system without the complexity and cost of the current GCA scanning beam system.

SUMMARY OF THE INVENTION

In accordance with one object of my invention, I provide a greatly simplified ground derived landing system, in contrast to present scanning beam GCA. In my invention, ground derived landing guidance is generated through the use of paired, overlapping fixed beams, aligned with the landing guidance path, rather than complex scanning beams. These paired, overlapping beams receive a signal radiated by the aircraft, which signal is then processed to generate landing guidance. In the most basic embodiment, an aircraft radiated signal is generated using a skin echo from a ground based transmitter associated with the fixed beam guidance antenna array, and that signal is received via the fixed beam guidance array and processed on the ground to derive information with regard to the location of the aircraft relative to the beams, and hence relative to the desired landing guidance path. This basic embodiment is an elementary fixed beam Ground Controlled Approach (GCA) System, in contrast to a scanning beam GCA.

In another embodiment of my invention, the aircraft radiated signal is generated by a low powered transmitter or radio beacon in the aircraft. That radiated signal is received by the fixed beam ground based guidance antenna array and processed to generate information with regard to the location of the aircraft with respect to the paired, overlapping fixed beams, and hence with respect to the desired landing guidance path. This allows one to use a low powered airborne transmitter and has the advantage of greatly simplifying the ground station; it has the disadvantage of requiring a beacon or extra equipment in the aircraft. However, many military aircraft are already equipped with a suitable beacon; hence, no added equipment is needed, which is a significant advantage of this embodiment of my invention.

In still another embodiment of my invention, I teach a method and apparatus for the interleaving of both air derived and ground derived modes of operation via use of one ground station, thus offering improved flexibility and greatly reduced overall cost and complexity for recovering aircraft by a variety of methods.

Many other advantages and features of my invention will become apparent from the drawings and descriPtion which follows.

BRIEF DESCRIPTION OF THE DRAWINGS

FIG. 1A-1D present an air derived landing system described in my U.S. Pat. No. 4,429,312;

FIGS. 3A-3C are diagrams of the basic embodiment of my invention;

FIG. 5 depicts an implementation of my invention when used to automatically recover Naval aircraft without requiring the addition of any equipment to the aircraft;

FIG. 6 depicts the use of ILS equipment for conveying ground derived landing guidance data to the aircraft;

FIG. 7 shows one version of interleaved operation of ground and air derived methods of aircraft recovery;

FIG. 8 describes a second version of interleaved operation of ground and air derived methods of aircraft recovery; and FIG. 9 is a pictorial representation of interleaved ground and air derived modes of operation for my invention.

DETAILED DESCRIPTION

Figure 2A:
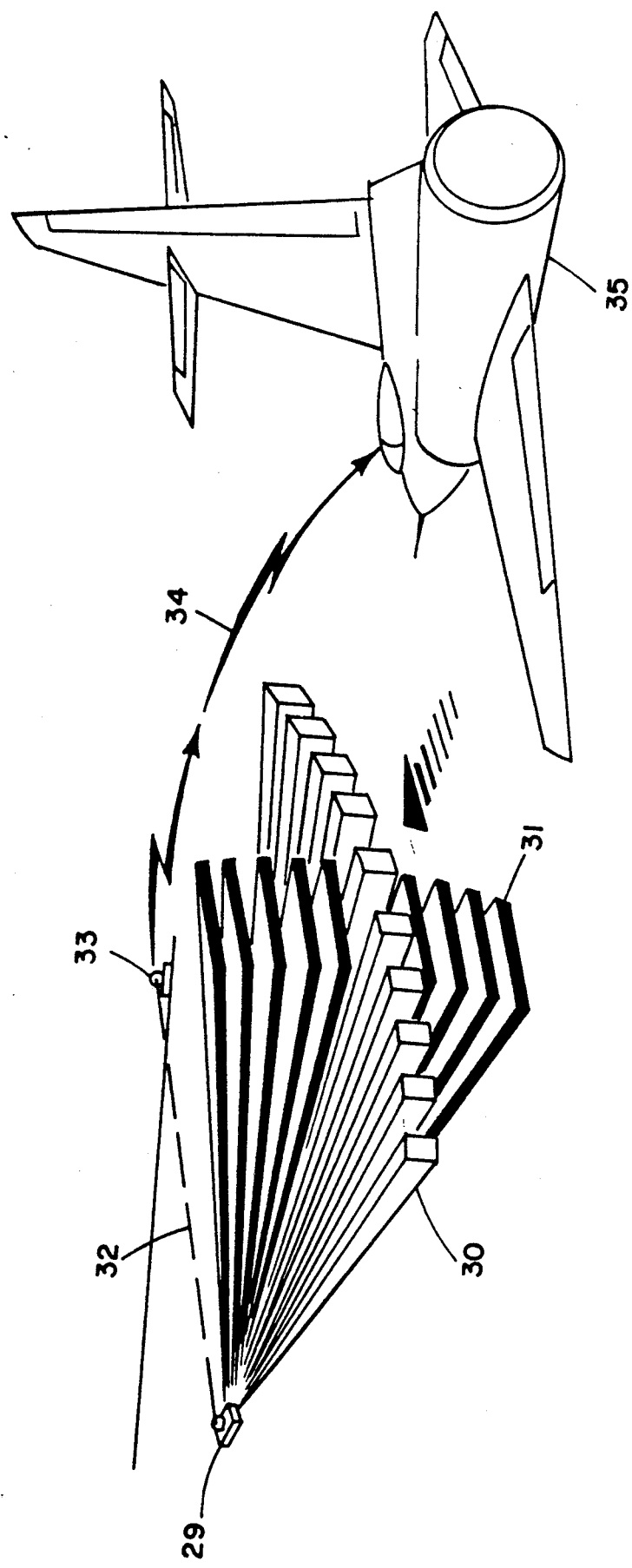
FIGS. 2A and 2B depict an existing scanning beam GCA system.

While my invention is susceptible of embodiment in many different forms, there is shown in the drawings and will herein be described in detail several preferred embodiments of the invention. It should be understood, however, that the present disclosure is to be considered an exemplification of the principles of the invention and is not intended to limit the invention to the specific embodiments illustrated and described.

The preferred embodiments of my invention are best understood by first describing one embodiment of the air derived landing system described in my U.S. Pat. No. 4,429,312 and a typical GCA scanning beam ground derived landing system.

PTAG

FIG. 1 illustrates the azimuth portion of one embodiment of the air derived landing system covered by my U.S. Pat. No. 4,424,312. This embodiment is for a split site system (i.e., one in which there is a separate localizer installation, on centerline, at the far end of the runway, and a glideslope installation, not shown, near touchdown, at the approach end of the runway, similar to the split site siting of well known prior art ILS installations). That system is currently marketed by Sundstrand Data Control under the tradename "PTAG".

A ground based radio frequency transmitter 10 generates pulse sequences. Each sequence comprises multiple pulses having predetermined time spacings, and the sequences occur at spaced time intervals, which intervals are large, compared to the duration of the pulse sequence. The transmitter 10 is sequentially connected, under control of logic unit 10a, via a line 2 and switch 3 to four antennas 4, 5, 6 and 7 that radiate two sets of paired, overlapping beams 9 and 14, and 11 and 12 of FIG. 1B, with each set respectively defining the same azimuth guidance path 13 by virtue of equal left/right signal intensity for such paired, overlapping beams.

In the aircraft, the signal is received via an antenna 15 and receiver 16. The output of the receiver is employed by processor 17 to generate guidance data by virtue of the comparison of the relative signal intensity received in the aircraft of signals from sets of paired, overlapping fixed beams. The generated guidance data is used to drive a conventional cross pointer type of guidance display 18. For the azimuth only embodiment shown in FIG. 1A, only the localizer needle 19 would be displaced in accordance with the processor derived guidance data. The glideslope needle 20 would be activated in response to a glideslope ground installation (not shown for purpose of simplicity).

In can be noted that these two sets of paired beams, each of which pairs overlaP on centerline, have different beam widths, one pair having wide beams 11 and 12, and one set employing narrow beams 9 and 14.

Each set of paired, overlapping beams provides the same basic guidance function. The wider beams provide the wider coverage coarse guidance function 21 of FIG. 1C, and the narrower beams provide the more restricted, in angle, precision guidance coverage 21a. The wider angular function (since it is generated by wider angular beams that could encompass lateral reflecting objects such as hangers adjacent to the landing runway) is susceptible to course errors generated by multipath signals and, therefore, has a tendency to have guidance function perturbations (such as depicted, 21b, in FIG. 1C). For this reason, the two wide beams 11 and 12 are generally used to provide only coarse (CGC) fly/left, fly/right guidance to provide the pilot a means of intercepting the coverage region of the narrower beams 9 and 14, which narrower beams provide precision proportional guidance (PGC) without perturbations, useful for the final straight in azimuth approach to touchdown. FIG. 1D outlines the resulting combined guidance function generated in this manner. The resulting guidance function provides fly/left, fly/right information until the narrower beams are intercepted, at which time linear proportional angular guidance (LPG) becomes available, also a depicted in FIG. 1D.

This use of two sets of coarse and precision paired beams are also utilized in ILS where the coarse beams are termed "capture beams". The use of such ILS capture beams is one of the improvements made in ILS since the 60's, which improvements are the reason that MLS is not finding acceptance, as noted previously, due to the complexity of its scanning beam technology in contrast to fixed beam technology and the satisfactory performance of fixed beams, as presently implemented. Similarly, in some MLS installations (i.e., ones having restricted scanning beam coverage), similar coarse fixed beams are used to permit caPture of the region covered by the precision guidance scanning team. In MLS, these fixed coarse guidance beams are termed "clearance beams".

In the aircraft, these beamed signals, sequentially received, contain identifying codes that identify the specific fixed beamed received signals and, hence, permit the processor to appropriately identify and thus properly utilize their measured intensities to provide the guidance function (FIG. 1D), which would be customarily displayed on the vertically oriented needle of the cross pointer display 18 of FIG. 1A. In FIGS. 1A and 1D, the needle 19 would be "pegged" at left or right position for fly/left 22 or fly/right 23 data, and would deviate linearly between such pegged positions to display precision proportional guidance (PGC) 24 over a specified region, typically ±2.5 degrees or ±5 degrees.

Figure 2B:
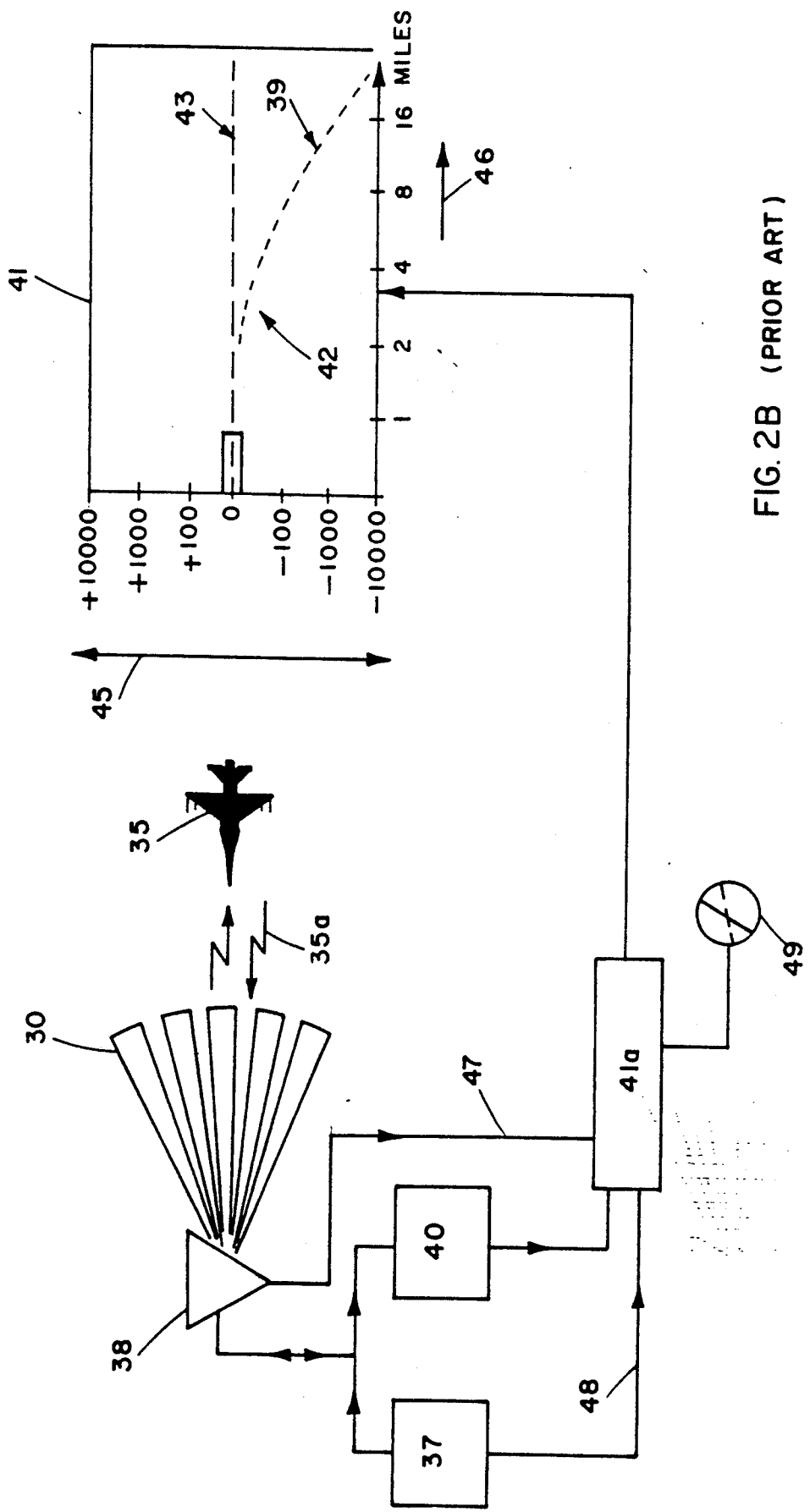

FIG. 2A depicts the prior art operation of a typical GCA system 29, also called PAR (Precision Approach Radar). In FIG. 2A, there is depicted the azimuth 30 and elevation 31 scanning beams that scan in azimuth over a nominal region of 20 degrees and elevation over 7 degrees. GCA is a co-located system as opposed to a split site system (i.e., the azimuth and elevation beams radiate from a common equipment, located at one site). The guidance data, derived at the GCA site 29 is typically relayed over a land line 32 to a radio transmitter 33 where it is relayed 34, typically by a voice radio to an aircraft 35. FIG. 2B is a block diagram of the azimuth portion of a GCA system. The elevation portion is similar.

In FIG. 2B, a transmitter 37 is connected to an azimuth antenna 38 with a narrow beam 30 that scans in azimuth The skin echo 35a from aircraft 35 is first detected by receiver 40, is then processed by a processor 41a and then displayed 39 on a CRT (Cathode Ray Tube) 41 as shown in FIG. 2B. Of interest in FIG. 2B is the fact that the azimuth display scale 45 is not linear, but tends to be compressed, for example in a logarithmic manner, thus reducing the display scale sensitivity for increased deviation off azimuth. This is because for large deviations off azimuth, which occur at longer ranges, the ground controller need only provide the pilot coarse guidance data, such as to fly a certain magnetic heading, thus permitting him to perform a centerline intercept. When close 42 to centerline 43, the ground controller can usefully employ the expanded azimuth scale in that region to provide more refined azimuth guidance to the pilot, to thus permit him to more clearly approach the desired centerline azimuth guidance path.

The processor 41a generates the rectangular co-ordinate display 41 by utilizing the angular position of antenna 38, as connected to the processor 41a by a lead 47 and the range data associated with the time of reception of skin echoes 35a, with respect to the time of transmitter 37 radiation, as inputted into the processsor through a lead or a wire 48. The processor also generates the compressed display scales 45 and 46. Now the processor 41a can also range and angle track the skin echo using well know prior art "track-while-scan" techniques. With knowledge of such range and azimuth position of the aircraft, the processor has the ability to output to a display 49 similar to the display 18 of FIG. 1A, a guidance function similar to that of FIG. 1D (i.e., one in which the controller, that is to provide guidance to the aircraft pilot, sees fly/left, fly/right data until the centerline is approached, at which time linear proportional guidance (LPG) data becomes available). This guidance function is, in many respects, similar to the guidance function provided by display 41 of FIG. 2B (i.e., it provides coarse guidance data equivalent to fly/left fly/right data until centerline is apProached, at which time linear proportional guidance (LPG) data becomes available for controller use).

Specifically, the large displacement portion of the FIG. 2B display corresponds to the fly/left, fly/right portion of FIG. 1C, and the expanded centerline position of the FIG. 2B corresponds to the non-pegged, or linear proportional region (LPG) of FIG. 1D. The ground based GCA controller would have a guidance display similar to that used by a pilot making an ILS or fixed beam type of air derived approach, and would be just as useful. In other words, the ground based GCA controller could relay to the pilot, by voice for example, information provided by a ground based display of the FIG. 1D type, for aircraft recovery purposes. Such ground based fly/left, fly/right guidance is just as useful for aircraft guidance purposes, whether generated and displayed on the ground for controller relay to the aircraft, or generated and displayed in the aircraft for direct pilot use.

FIRST EMBODIMENT

FIG. 3 depicts the azimuth portion of one version of a ground derived aircraft recovery system in accordance with my invention. In FIG. 3A, a transmitter 50 with associated receiver 51 is sequentially connected via wire 57 and switch 56, controlled by switch control unit 58, to four antennas 52, 53, 54 and 55 that generate paired, overlapping fixed guidance beams, both wide and narrow, with patterns 52a, 53a, 54a, and 55a. In the following discussion, it is assumed that the aircraft 35 is within the noted overall angular coverage of ±40 degrees, and at a range consistent with system radiated power (i.e., within a range such that a usable skin echo will always be received on at least one of the four noted antennas). The transmitter and associated receiver, when switched to a particular antenna, is left connected to that particular antenna for a length of time adequate to receive a skin echo 35a back from an aircraft at a maximum range of interest, say 15 miles or about 180 microseconds in time.

The signal radiated, when the transmitter 50 is connected to an antenna, is received at the aircraft 35, where a skin echo 35a is generated. This skin echo is received on the ground via the same antenna and connected receiver, where an attached processor 60 acquires and range tracks the skin echo and measures the echo amplitude. A similar procedure is implemented as the transmitter and receiver is sequentially connected to the other three antennas. The range and amplitudes of all detected echoes are stored in processor 60 and processed in accordance with knowledge of antenna patterns, as in present practice for fixed beam air derived systems such as described in my U.S. Pat. No. 4,429,312, to provide aircraft location in range and azimuth. This location data is then used to drive display 61 of FIG. 3A in a conventional left/right needle manner with associated range meter 62, displaying range.

It can be noted that, depending on the aircraft location with respect to the coverage and gain of specific antennas, there may not be a signal (skin echo) received from the aircraft when a particular antenna is connected to the transmitter 50 that is strong enough to be detected and used. This absence of an echo for any particular antenna use does not, however, preclude the generation of fly/left, fly/right data for controlling the aircraft towards the centerline 13, at which time coverage by all four antennas is provided. This is because, as discussed above, the aircraft is assumed to be within the overall ±40 degrees angular coverage of the system, and within a range (nominally 15 miles) such that a skin echo will always be generated by use of one or more of the four noted antennas and the radiated power associated with the system. I have found that if an echo is generated from use of one such antenna, such as one of the broad beam antennas 52, with pattern 52a, such an echo can be used to generate fly/left or fly/right guidance data that can be used to guide the aircraft towards centerline 13, such that echoes will be generated by all four antennas, including these used to provide linear proportional guidance.

FIG. 3B provides additional information on this subject, depicting the transmitted and received signals for different switched 56 positions and different aircraft locations with respect to the antenna patterns 52a, 53a, 54a and 55a.

In FIG. 3B, there is shown the time 65 at which the ground transmitter radiates, and the relative amplitudes of skin echoes from aircraft at different angular positions, with respect to the antenna patterns and at different ranges. Four transmissions are illustrated in FIG. 3B for a total of five aircraft at five different angular locations with respect to the antenna patterns, specifically at −40 degrees, −5 degrees, 0 degrees, +5 degrees and +40 degrees, and at five different ranges, 4, 6, 8, 10 and 12 miles. All echoes are shown normalized in range. Showing five aircraft at five different ranges and five angular positions, with range normalized returns, is "equivalent" to having one aircraft at the same range, moved to five different angular positions. FIG. 3B, with aircraft at different ranges and angular positions, is just a convenient graphical representation to employ, to explain my invention.

For an aircraft at −40 degrees and at four miles, a skin echo 66 will only be received for the transmitter connected to antenna 52, with pattern 52a, since the aircraft at that angular position is not within the angular coverage of the other antennas.

For an aircraft at −5 degrees, and at six miles, skin echoes 67, 68, 69 and 70 will be received by all antennas, with the relative amplitudes shown, when the receiver is switched to them. For the aircraft on centerline, at eight miles, equal intensity echoes 71 will be received for the transmitter connected to any of the antennas, in accordance with the noted antenna patterns 56a, 57a, 58a and 59a. For an aircraft at +5 degrees, the relative echo intensities will be as shown. For an aircraft at +40 degrees, an echo 72 will only be received with the transmitter connected to antenna 53 with pattern 53a. The resulting derived guidance data, generated by processor 60 and displayed on display 61, can then be utilized by a ground based controller to recover aircraft.

It can be further noted that the transmitted signal can be radiated from a single (i.e., a fifth) antenna, with a relatively uniform radiating pattern encompassing the ±40 degrees coverage desired, with the original four directive antennas 52, 54, 53 and 55 being switched to a receiver, separate from the transmitter, for the generation of landing guidance data. The transmitter and its associated antenna, should be relatively close to the switched receiving antennas and at a known location with respect to them in this configuration.

SECOND EMBODIMENT

Another form of my invention consists of having the aircraft 35 carry a transmitter. It is the signal 35a from this airborne transmitter, as received by the ground receiver 51 attached to the switched antennas 52, 53, 54 and 55 that is used to generate the ground derived landing guidance instead of the skin echo discussed previously. In one implementation of this configuration, the airborne transmitter is Part of a beacon (i.e., receiver and associated pulse transmitter, see FIG. 3C), and this beacon, upon reception of the signal from the ground transmitter used to generate the skin echo, transmits a single pulse reply, which is processed just like a skin echo. The beacon transmission would be delayed by a known constant amount, say 10 microseconds, so that it would appear after the skin echo, so as to be distinguishable from it.

A benefit of using an airborne transmitter, as part of a beacon for example, is that the airborne transmitter radiation can be used to generate a detectable reply without the need for the high powered ground transmitter required to generate a skin echo, thus greatly simplifying the ground station. Specifically, the ground station transmitter 50 can be a very much lower powered solid state unit and, hence, extremely small and lightweight. Such a low powered compact ground transmitting unit is desirable for certain unique military requirements where ground station weight and portability is critical.

The airborne beacon may require, or it may be desirable to have it reply to, a coded pulse pair, rather than a single pulse, for reasons discussed later. In the case where skin echo operation is not required and only a low powered ground station transmitter is employed, this is readily accomplished (i.e., the low powered solid state unit can readily transmit a coded two pulse beacon interrogating signal). When both skin echo and beacon operation is desired, it is not required, although it is still practical, for the high powered transmitter to radiate dual pulse coded interrogations since airborne beacons have logarithmic receivers which can generate the desired two pulse coded output signal to trigger the airborne transmission, even if the received two pulse signals consist of a high level and associated low level signal. The ground station transmitter would thus radiate a signal for skin echo generation, followed by a second low level transmission (the same transmitter may be used) for coded beacon triggering. A usable skin echo would be received from the high powered transmission and a usable beacon reply from the combination of the high powered and low level ground station transmission. The skin echoes generated from the low level ground station transmission would be, as such, low level, so as not to mask the skin echoes from the high level transmissions.

If the beacon only generates a single pulse reply, as discussed above, then ground based switching operation and data processing is essentially identical to the skin echo operation. The beacon can, however, readily transmit two or more pulses, thus permitting a different mode of antenna switching and processing, which operation can generate all the required signal strength data for ground based generation of the guidance data for each ground station transmission, rather than requiring four transmissions, as discussed above, for the skin echo and the single pulse beacon reply case. This somewhat different mode of operation is discussed below, for the case whereby the beacon radiates a four pulse reply. The ground station block diagram would be as in FIG. 3A, with only a change in switching oPeration, as outlined in FIG. 4 and as discussed below.

As in FIG. 3A, the ground based transmitter is sequentially connected to and radiated in sequence from each of the four antennas. The particular antenna that is used for a particular sequential radiation is left connected to the transmitter and associated receiver for a length of time adequate to receive a beacon reply signal back from an aircraft at the maximum range of interest, say 15 miles. The transmitted signal, as received in the aircraft, is used to initiate a similar frequency beacon rePly. The beacon reply, however, consists of four pulses, spaced several microseconds apart, instead of the single pulse discussed previously.

As noted in the case of the FIG. 3A configuration, the aircraft is not always in the coverage of all the ground antennas and, hence, the transmitted signal, as radiated for a particular switch position (i.e., connected to a particular antenna), may not be strong enough, as received in the aircraft, to trigger a beacon reply.

However, if an aircraft is within the maximum range of interest and is within the defined ±40 degrees angular coverage of the aircraft recovery system, then a signal transmitted from at least one of the guidance antennas will generate a four pulse beacon reply. The first pulse of this beacon reply, as received on the ground, can then be detected and range tracked by the ground based guidance processor 60 attached to the receiver 51 for at least one switch position and associated connected antenna (i.e., transmitter radiation from one of the antennas will always trigger the beacon in an aircraft), provided it is within the angular coverage and prescribed range of the aircraft recovery system. This guidance processor then contains stored information as to the range of a particular aircraft (i.e., the time after transmission at which the first pulse of the four pulse beacon reply will be received). The processor can then be used to raPidly and sequentially connect the other three antennas to the receiver, at a time coincident with the known range of a particular aircraft, and at a speed such that the next three pulses will be detected, if strong enough when received by such switched antennas, and then measure their amplitudes to generate either fly-/left, fly/right guidance or linear proportional guidance, if for example the aircraft is within the coverage of the precision fixed beam guidance antennas.

In review, the overall operation is as follows: The transmitter 50 is sequentially connected t the four antennas and radiates transmissions. The use of at least one of such four antennas will result in a beacon transmission. The first pulse of the four pulse beacon reply is range tracked. This establishes in the processor 60 the time after transmission at which beacon replies can be expected. As the first of these replies from the aircraft at closest range is received, the amplitude of it, as received on the antenna, which is switched to the transmitter and associated receiver for this interrogation, is measured. The other three antennas are then rapidly switched so that the next three beacon replies are received on different antennas, and their amplitudes measured. The switch is then connected back to the original antenna, awaiting the beacon replies from the aircraft next in range. When the last expected reply is obtained, from an aircraft at the maximum range coverage of the system, the transmitter is connected to a next antenna, transmits, and the sequence is repeated.

This process can be implemented for multiple aircraft on final. It should be noted that the time interval associated with the radiation of the four beacon Pulses should be short enough so as not to encompass the propagation time associated with the nominal separation of two aircraft in succession on final, nominally two miles, or 24 microseconds. A beacon pulse spacing of several microseconds is thus adequate in this regard.

Figure 4:
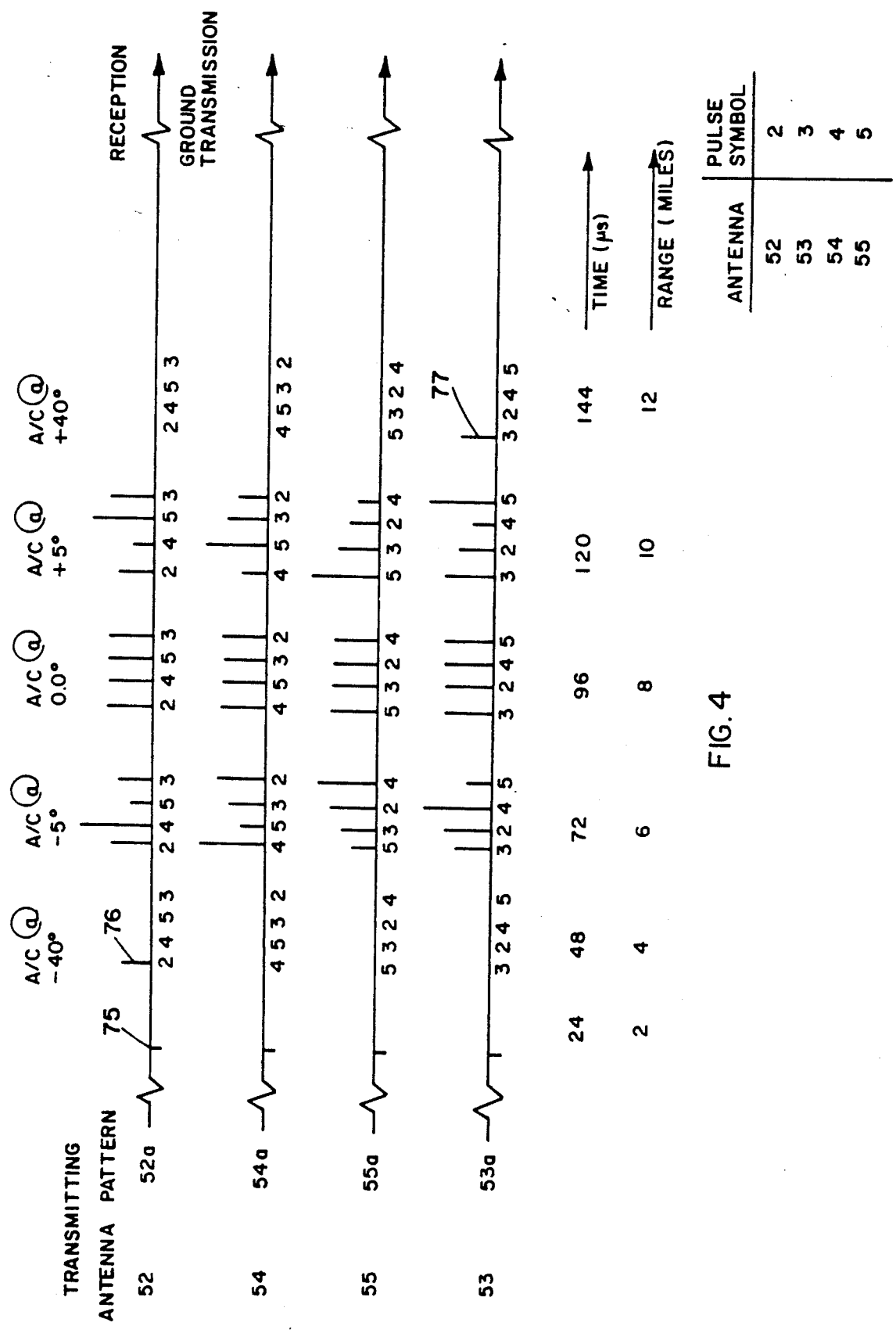
FIG. 4 depicts the use of the ground equipment of FIG. 1 to provide ground derived guidance data, using an airborne transmitter.

FIG. 4 provides additional information on the timing sequence of operation, depicting the transmitted and received beacon signals for different switch 56 positions and different aircraft angular locations with respect to the antenna patterns 52a, 53a, 54a and 55a.

In FIG. 4, there is shown the time 75 at which the ground transmitter radiates and the times at which the relative amplitudes of the beacon replies for aircraft at different angular positions with respect to the different antenna patterns, and at different ranges are received. Four transmissions are depicted in FIG. 4, with five aircraft at five different angular locations with respect to the antenna patterns, sPecifically, at −40 degrees, −5 degrees, 0.0 degrees, +5 degrees and +40 degrees and at five ranges, as depicted in FIG. 3A. All echoes are shown normalized in range. In FIG. 4 (the timing sequence diagram for this implementation of the apparatus of FIG. 3A), the transmitter first radiates via the antenna 52 and is left connected to that antenna until after reception of the first pulse of the beacon reply, if the beacon has been triggered by its reception of adequate triggering power by the connection of and subsequent radiation of the transmitter signal by that antenna 52. With the reception of this first reply, the antennas are then rapidly switched via switch 56 so that the second pulse of the four pulse beacon reply will be received by antenna 54, and the third pulse by antenna 5, and the fourth pulse of antenna 53. The presence or absence of a received pulse and the amplitude of such pulses, for any specific continuation of transmitting and receiving antennas, will depend on the angular location of the aircraft with respect to the noted antenna patterns 52a, 53a, 54a and 55a. Specifically, as can be noted in FIG. 4, for an aircraft at −40 degrees, the beacon will be triggered, since the aircraft at −40 degrees is within the coverage of antenna 52 with pattern 52a. Now, however, only the first pulse 76 of the four pulse reply of a received beacon signal will be received via antenna 52 with pattern 52a, since the aircraft at −40 degrees only falls within the coverage of that antenna pattern 52a (i.e., the next three beacon pulses will arrive back at the ground station when antennas 54, 55 and 53 are connected, and since an aircraft at −40 degrees falls outside the coverage of those antennas, a detectable beacon signal will not be obtained by receiver 51). The receiving antenna timing sequence is provided by "labelling" the received pulses with the last, by digit, of the antenna that is connected to the receiver when a particular pulse of a four pulse train is received.

For aircraft at −5 degrees, 0 degrees and 5 degrees, and at ranges 6, 8 and 10 miles, the beacon will be triggered via use of antenna 52 and pulses will be received for all switch positions and associated antennas with relative amplitudes as shown. For an aircraft at +40 degrees, only one beacon pulse 77 will be received, on antenna 53 with pattern 53a, since the aircraft at that location only falls within the coverage of that antenna 53.

It can be noted that if the beacon replies with only a single pulse or double pulse, as for example if the aircraft already has installed a single pulse beacon, then operation would be similar, except that the rate at which data would be generated would be somewhat slower (i.e., a complete set of guidance data would be received only after four ground station transmissions.

The conventional technique for relaying GCA ground derived guidance data is via voice relay, as in FIG. 2. However, it is also practical to relay the data to aircraft via a data link of some type, particularly a data link already installed for such purposes. This data link type of operation is depicted in FIG. 5, whereby the ground derived guidance data is used to modulate a data link ground station transmitter 80, with the radiated data being received in the aircraft data link receiver 81 and used to activate a pilot display 82, or being directly coupled to the autopilot for automatic control. Of particular interest in this connection is that the majority Of U.S. Naval airCraft are equipped with both a suitable beacon and a NTDS (Naval Tactical Data System) data link, as depicted in FIG. 5.

In FIG. 5 there is shown a typical U.S. Naval aircraft 35 equipped with a suitable beacon and a data link receiver 81. This data link is used, in one U.S. Naval carrier based application, for direct input to the autopilot, for automatic landing control from the ship. In this shipboard application, the AN/SPN-42 landing system precisely locates the landing aircraft via a specialized shipboard automatic tracking radar and associated aircraft beacon, computes commands for landing purposes, and data links these commands to the aircraft autopilot. If, now, the corresponding ground station 80 portion of the data link is connected to the output of the processor 60, then guidance data can be relayed to the aircraft, also for automatic landing control purposes. This can be accomplished, without any modification to over several thousand U.S. Naval aircraft equipped as shown in FIG. 5, thus emphasizing one major immediate application of my invention.

Droned aircraft or Remote Pilotless Vehicles (RPV's), employed for tactical purposes, are also equipped with a data link for remote automatic control purpose and, hence, such droned aircraft can also be automatically recovered by my invention by only the addition of a suitable beacon. It should be understood, in this regard, that, throughout this specification, the term "aircraft" should be considered to encompass both manned and unmanned vehicles including spacecraft.

Another useful data link that can be employed is termed an ILS data link, as depicted in FIG. 6, for azimuth implementation. In FIG. 6, the output of the processor 60 of FIG. 3 is used to control the level of a 90 Hz oscillator 85 and a 150 Hz oscillator 86 that are used to modulate a 100 MHz transmitter 87 in accordance with ILS standards. This 100 MHz signal is radiated via antenna 88 to antenna 89 in the aircraft, which is connected to a conventional ILS localizer receiver 90. This receiver 90 detects this signal and uses it to drive an ILS display 91, in accordance with ILS practice, or uses it to activate the autopilot, also as in current practice for automatic recovery. In a similar manner, the glideslope portion of my invention (not shown for purposes of simplicity) would suitably modulate a 300 MHz transmitter. In this way, aircraft suitably equipped with ILS avionics, which encompasses the vast majority of aircraft of interest, can be provided recovery guidance, using my invention, by the addition of a suitable airborne beacon, which beacon can be of the order of 10 cubic inches, and weigh less than a pound. As noted above, the majority of U.S. Naval aircraft already contain a suitable beacon.

THIRD EMBODIMENT

In a further embodiment of my invention, I have found that it is possible to interleave both ground and air derived guidance modes of operation. The feasibility of interleaving is understandable once it is realized (in a first interleaving mode of operation) that the time required for radiation of signals from the ground station and the airborne reception and generation of air derived operation, as well as the time required for the radiation of signals from the ground and the corresponding reception of signals for the aircraft for generation of ground derived guidance, occupies a very small percentage of the total time available. Ample time also exists for a mode of operation which is based on the sequential and non-interfering operation of both air derived and ground derived guidance generation.

Turning to FIG. 7, there is shown the timing of such an operating mode. First, a two pulse interrogation (consisting of a high level pulse 92 for generating a skin echo and a low level pulse 93 for generating the required pulse pair for triggering the beacon) is radiated from the ground. All the required skin and beacon reply signals are received for aircraft, at a maximum desired range of fifteen miles, within less then 300 microseconds. A skin echo 94 from an aircraft at three miles is shown, as is a skin echo 95 with an associated single pulse beacon echo 96 for an aircraft at twelve miles. This operation is repeated at least 120 times a second to insure guidance loop stability, since I have found that a complete measurement of aircraft position is required 30 times a second, and four transmissions are required to obtain adequate skin echo data for a complete position determination. The next such transmission for generation of ground derived landing guidance will thus occur approximately 9000 microseconds later. Thus, there is ample time in between such transmissions to radiate the signals required for air derived operation as shown in FIG. 7. These low level transmissions 160 are shown being radiated some 300 microseconds after the radiation of the signal(s) required for generation of ground derived landing guidance.

In another mode of operation, I have found that it is possible to radiate only one sequence of transmissions that will provide both the required signals in the aircraft for the generation of air derived guidance, and will generate either a skin echo or beacon reply for the generation of ground derived landing guidance. This is discussed below with reference to FIG. 8.

In FIG. 8, the ground based guidance system first transmits a series of pulses 97 for generation of air derived guidance from each antenna, as in FIG. 1, instead of the nominal single or double pulse transmission required for skin echo or beacon transmission generation, as discussed with respect to FIGS. 3, 4 and 7. These pulse sequences, as noted previously with respect to FIG. 1, are used to identify a particular guidance beam, and/or to transmit data to the aircraft such as the location of particular guidance equipment with respect to the runway, for example. In addition to the pulses utilized in the aircraft for the generation of air derived data, two pulses 98 are radiated with a spacing corresponding to the code set into the receiver portion of an airborne beacon that might be utilized in those aircraft not having an air derived landing guidance processor. One of these pulses 99 could be high level to generate a skin echo reply, with an associated low level pulse 100 (just as that shown in FIG. 7). In the aircraft, the signals used for generation of air derived guidance are received as before and used, as in my U.S. Pat. No. 4,429,312 to generate air derived guidance data, provided the aircraft has an appropriate processor.

Moreover, if the aircraft does not have an appropriate processor but only a beacon, then the beacon transmission, as triggered by the reception of the two added pulses with a coded spacing, is received on the ground and the antennas appropriately switched, on reception of such beacon signals, to permit generation of ground derived guidance data, for relay to the aircraft via voice or a data link. Of significance to the interleaving process is the timing sequence. Specifically, for guidance loop stability purposes, I have found that it is necessary to generate data at about a nominal 30 Hz rate; therefore, data would be transmitted at 120 Hz rate in order to obtain adequate skin echo data.

Now, the transmitting sequence of pulses used to generate the airborne guidance data might occupy 40 microseconds, based on transmitting six pulses for air derived guidance data pulse, and the two coded pulses required for beacon triggering. The airborne beacon, therefore, replies after a fixed delay following reception of this code, say a nominal ten microseconds. It replies with a four pulse code, as is discussed previously, with pulses separated by say, 5 microseconds. Assuming two aircraft are on final at five and fifteen miles with the fifteen mile aircraft equipped with a beacon and a round trip propagation time of about 12 microseconds per mile, then the timing sequence would be as shown. Specifically, a skin echo 101 will be received from the aircraft at five miles, and a skin echo 102 and a four pulse beacon reply 103 will be received from the aircraft at 15 miles. For a maximum aircraft range of fifteen miles, as discussed previously, the total sequence would last less than 300 microseconds, which is much less than the (9 ms) spacing between the ground station transmissions.

FIG. 9 provides a graphical representation of the interleaved air derived and ground derived operation, for either of the above discussed two modes of interleaving (FIGS. 7 and 8). In FIG. 9, there are shown two aircraft at different ranges and at different positions with respect to the desired landing path. The aircraft 150 at the greatest range is configured with a processor and associated receiver which is generating the proper Pilot display 104 showing the aircraft on glideslope, left of course. The other aircraft 200 is configured with a beacon and the ground derived display 105 shows the proper aircraft position, below glideslope and on centerline. The data from the display 105 would then be relayed to the pilot of the beacon equipped aircraft 200 via voice or data link 300. However, if the ground based transmitter is powerful enough, then a usable skin echo will be generated and a beacon will not be required. In accordance with my previous explanation, guidance may be relayed to the aircraft via either voice, an ILS data line, NTDS (Naval Tactical Data System), a drone control link, or other suitable type of data link, such as for example, encoding of the ground station transmission.

Thus, it should be apparent that numerous variations and modifications may be effected without departing from the true spirit and scope of the novel concept of my invention. For example, the airborne transmission need not be initiated by reception of a similar or same frequency signal from the ground station, as discussed above, but can be initiated by other frequency ground station transmissions (i.e., such as a TACAN ground station transmission, operating in the Air-to-Air mode). That transmission, when received in corresponding airborne TACAN equipment, (which is carried by all U.S. military aircraft) can be used to initiate the desired airborne landing system radiations for ground based reception and guidance generation purposes. All that is required at the ground station is low powered TACAN transmitting equipment to initiate the airborne transmission, with knowledge of the time at which such transmission was initiated.

Alternatively, the airborne transmission can be free running and coded with identity, and the ground station processor can receive such transmission and generate guidance data for relay to the specific aircraft with the identified code.

Alternatively, the transmission from the aircraft can be initiated at a known and assigned time, in a common clock time, such as GPS clock time, as is described in my U.S. patent application Ser. No. 863,662 filed on May 15, 1986 and entitled "Advanced Instrument Landing System". It should be noted that, in the general sense, the controlled initiation of such airborne transmissions of signals for remote guidance generation by the use of paired, overlapping receiving beams, is accomplished at a known time with respect to a time clock at the remote guidance station. As noted above, this initiation can be accomplished at a known and assigned time, at both the guidance station(s) and in the aircraft. Alternatively, the airborne transmission can be initiated by a guidance station clock triggering a ground transmission and initiating an airborne transmission. This airborne transmission is then range tracked at the guidance station. Such range tracking establishes the range between the guidance station and the airborne transmitter radiating such airborne transmissions, and hence establishes the propagation time between such guidance stations and the airborne transmitter. This propagation time can then be used to establish the known time at which such airborne transmission occurred, in the guidance station time base. A similar analysis applies to the airborne radiated skin echo resulting from a transmission from a guidance station in such guidance stations' time base.

It is also possible, where only one aircraft is involved at a time, to use a very low powered continuously radiated (CW) beacon. In that case, it is possible to use four receivers, continuously attached to each of the four antennas, and to compare the output of such continuous wave receivers to generate guidance data. Using only one receiver, switched to the various antennas, is also practical for such a continuous wave beacon. Of course, multiple receivers, each permanently attached to each antenna with their outputs compared, can also be used for non-continuous wave airborne transmitting sources (i.e., pulsed sources transmitters, as discussed previously).

In still another application of my invention, the equipment which heretofore associated with the ground (i.e., the receiver, the paired antennas and the processor) may be installed on a mobile platform such as a truck, or an aircraft carrier, or even another aircraft. In particular, the antennas may be installed on a tanker aircraft which is used to refuel another, and usually smaller, aircraft. Because of the small volume of equipment involved, such an addition could be made to existing tanker aircraft while not adversely effecting the weight distribution and flying characteristics of the tanker aircraft.

From the foregoing, it will be appreciated that there are various applications for my guidance system to provide guidance to a vehicle (i.e., an aircraft in flight) moving relative to a reference platform (i.e., another aircraft or surface vehicle), whereby the reference platform may or may not be moving. Environments in which such a guidance system can be usefully employed include airborne aircraft refueling operations, docking maneuvers in space, airborne space vehicle recovery operations, and the guidance of aircraft, under IFR (Instrument Flight Rules) to visual contact with a landing area. Such systems also find use in the testing of military aircraft electronic systems, by providing an accurate indication of the orientation of a targeted object with respect to a source of ordinance, for example, for comparison purposes.

Accordingly, it is intended to cover all such alternatives, modifications and variations, as set forth in the scope of the claims which follow.

I claim:

1. A system for providing ground derived approach guidance for an aircraft for guiding the aircraft along an approach path toward a landing site, comprising:
   ground based means located near the landing site for transmitting signals toward an aircraft approaching the landing site;
   a plurality of ground based fixed beam directional antennas disposed near the landing site oriented so that the fixed beams for the antennas overlap along the approach path;
   means for receiving signals received by said plurality of antennas from an aircraft in response to signals transmitted for the ground based transmitting means and comparing the relative amplitudes of the received signals to determine the position of the aircraft relative to the approach path;
   a transmitter located on board the aircraft, said transmitter being responsive to signals received from the ground based transmitting means for generating a reply transmission in response thereto for receipt by said fixed beam antennas, wherein said ground based transmitting means includes means for transmitting pulses and wherein said transmitter on board the aircraft is responsive to each pulse received from said ground based transmitting means for transmitting a plurality of pulses in response to each received pulses, wherein said receiving and comparing means is operative to receive a different one of said plurality of pulses on each of said plurality of antennas and to compare the amplitude of said received pulses.

2. A system as recited in claim 1 wherein said receiving means is responsive to signals from an approaching aircraft resulting from reflections from the skin of the aircraft and to signals transmitted from the transmitter located on an aircraft to determine the position of the aircraft.

3. A system as recited in claim 2 wherein the signal from the ground based transmitter is a pulse signal and wherein the transmitter on board the aircraft is a pulse transmitter, and wherein said transmitter on board the aircraft is responsive to a pulse received from the ground based transmitter for generating a pulse in response thereto after a predetermined time interval following the receipt of the pulse from said ground based transmitter.

4. A system as recited in claim 3 wherein said predetermined time interval is selected to permit the generated pulse to be distinguished from a reflection from the skin of the aircraft.

5. A system as recited in claim 1 further including ground based switching means for selectively connecting said transmitting means and said receiving means to said fixed beam antennas, said switching means being operative sequentially to connect said transmitting means to each of said antennas to cause the signal from said transmitting means to be sequentially transmitted by said antennas, and sequentially to connect said receiving means to each of said antennas after the transmission of each signal by each antenna.

6. A system for providing ground derived approach guidance for an aircraft for guiding the aircraft along an approach path toward a landing site, comprising:
   ground based means located near the landing site for transmitting signals toward an aircraft approaching the landing site;
   a plurality of ground based fixed beam directional antennas disposed near the landing site oriented so that the fixed beams of the antennas overlap along the approach path;
   means for receiving signals received by said plurality of antennas from an aircraft in response to signals transmitted from the ground based transmitting means and comparing the relative amplitudes of the received signals to determine the position of the aircraft relative to the approach path;
   a transmitter located on board the aircraft, wherein said transmitter is responsive to signals received from the ground based transmitting means for generating a replay transmission in response thereto for receipt by said fixed beam antennas,
   wherein said receiving means is responsive to signals from an approaching aircraft resulting from reflections from the skin of the aircraft and to signals transmitted from the transmitter located on an aircraft to determine the position of the aircraft, wherein the signal from the ground based transmitter is a pulse signal and wherein the transmitter on board the aircraft is a pulse transmitter, and wherein said transmitter on board the aircraft is responsive to a pulse received from the ground based transmitter for generating a pulse in response thereto after a predetermined time interval following the receipt of the pulse from said ground based transmitter, wherein said predetermined time interval is greater than twice the propagation time between the ground based transmitter and the approaching aircraft, and
   wherein said receiving means includes means for determining whether a pulse received from an aircraft is a reflected pulse or a pulse from a transmitter on board the aircraft based on the time of arrival of the received pulse.

7. A system as recited in claim 6 wherein said ground based transmitting means includes means for transmitting relatively high and relatively low power pulses, said transmitter on board the aircraft being responsive to said relatively low power pulses.

8. A system as recited in claim 6 further including means for transmitting the ground derived guidance information to approaching aircraft.

9. A system as recited in claim 8 wherein said guidance information transmitting means includes means for transmitting said guidance information via a data link.

10. A system as recited in claim 9 wherein said data link is a Naval Tactical Data System data link.

11. A system as recited in claim 9 wherein said data link is a remote control data link.

12. A system as recited in claim 9 wherein said data link is an ILS data link.

13. A system for providing guidance to an aircraft flying along an approach path to a landing site, comprising:

a plurality of fixed beam antennas having beams that overlap along the approach path;

means coupled to said antennas for transmitting guidance signals from said antennas, said guidance signals being usable by an approaching aircraft to provide air derived guidance information; and means coupled to said antenna for receiving signals from an approaching aircraft in response to the transmitted guidance signals and comparing the amplitudes of the signals received from said antennas to provide ground derived guidance information, wherein the guidance signals transmitted by said transmitting means include first and second guidance signals, said first guidance signals being usable for deriving the ground derived guidance information and said second guidance signals being usable for deriving the air derived guidance information.

14. A system as recited in claim 13 wherein the first and second guidance signals are interleaved in time.

15. A system as recited in claim 13 wherein the guidance signals are periodically transmitted as a plurality of individual transmissions and wherein each individual transmission includes both first and second guidance signals.

* * * * *